US007068715B2

(12) United States Patent
Hoctor et al.

(10) Patent No.: US 7,068,715 B2
(45) Date of Patent: Jun. 27, 2006

(54) ULTRA-WIDEBAND COMMUNICATIONS SYSTEM AND METHOD USING A DELAY HOPPED, CONTINUOUS NOISE TRANSMITTED REFERENCE

(75) Inventors: Ralph Thomas Hoctor, Saratoga Springs, NY (US); David Michael Davenport, Niskayuna, NY (US); Aaron Mark Dentinger, Niskayuna, NY (US); Nick Andrew VanStralen, Ballston Lake, NY (US); Harold Woodruff Tomlinson, Jr., Scotia, NY (US); Kenneth Brakeley Welles, II, Scotia, NY (US); John Erik Hershey, Ballston Lake, NY (US)

(73) Assignee: Genral Electric Company, Niskayuna, NY (US)

( * ) Notice: Subject to any disclaimer, the term of this patent is extended or adjusted under 35 U.S.C. 154(b) by 802 days.

(21) Appl. No.: 09/974,032

(22) Filed: Oct. 10, 2001

(65) Prior Publication Data

US 2003/0069026 A1 Apr. 10, 2003

(51) Int. Cl.
*H03K 9/08* (2006.01)
*H04B 1/707* (2006.01)
(52) U.S. Cl. ..................................... 375/239
(58) Field of Classification Search ............. 375/132, 375/135, 136, 140, 145, 149, 142, 150, 237, 375/238, 239; 370/441, 320
See application file for complete search history.

(56) References Cited

U.S. PATENT DOCUMENTS

| 4,641,317 | A | 2/1987 | Fullerton |
| 6,252,962 | B1 * | 6/2001 | Sagey .................. 380/274 |
| 6,810,087 | B1 | 10/2004 | Hoctor et al. |

OTHER PUBLICATIONS

"Impulse Radio: How It Works," Moe Z. Win, Robert A. Scholtz, IEEE Communications Letters, vol. 2, No. 2, Feb. 1998, pp. 36-38.
"Transmitter Location for Ultra-Wideband, Transmitted-Reference, CDMA Communication System," RT Hoctor; JE Hershey; NA Van Stralen; HW Tomlinson, Jr., U.S. Appl. No. 09/973,140.

* cited by examiner

*Primary Examiner*—Kevin Kim
(74) *Attorney, Agent, or Firm*—Jean K. Testa; Donald S. Ingraham

(57) ABSTRACT

An ultra-wideband (UWB) communications system combines the techniques of a transmitted reference (TR) and a multiple access scheme called delay hopping (DH). Combining these two techniques using UWB signaling using a continuous noise transmitted waveform avoids the synchronization difficulties associated with conventional approaches. This TR technique is combined with the DH multiple access technique to create a UWB communications scheme that has a greater multiple access capacity than does the UWB TR technique by itself.

28 Claims, 11 Drawing Sheets

ULTRA-WIDEBAND COMMUNICATIONS SYSTEM AND METHOD USING A DELAY HOPPED, CONTINUOUS NOISE TRANSMITTED REFERENCE

STATEMENT REGARDING FEDERALLY SPONSORED RESEARCH & DEVELOPMENT

The U.S. Government may have certain rights in this invention pursuant to the National Institute of Standards and Technology Contract Number 70ANB0H3035 awarded by NIST.

BACKGROUND OF THE INVENTION

This invention relates to the transmission, reception, detection, synchronization, and use of ultra-wideband communication systems. In particular, it pertains to a continuous noise transmitted-reference, delayed hopped (TR/DH) ultra-wideband radio communications system.

Conventional ultra-wideband (UWB) radio systems operate by transmitting and receiving a sequence of very short radio frequency (RF) pulses, the duration of which is typically less than a nanosecond. This is referred to as impulse radio. The individual pulses typically have low energy. Consequently, the low duty cycle of the pulsed waveform results in a very low average power.

One conventional approach to implementing UWB communications systems is to utilize a pulse position modulation (PPM) scheme to impress information onto a UWB carrier. PPM is an orthogonal signaling scheme by which a receiver determines in which one of a number of different time windows a received pulse appears, and this determination conveys a quantum of information, e.g., if there are two possible time windows, determination of one window conveys one bit of information; for three windows, a trit of information is conveyed, for four windows, two bits, and so on.

Successful operation of a PPM system requires accurate time synchronization be acquired and maintained between transmitter and receiver. For example, for an UWB PPM system, this synchronization must be accurate to within a fraction of the pulse duration. Because the pulse duration is quite small in a UWB system, the synchronization requirements are quite stringent. The time required to establish synchronization for this method can be prohibitive, and acquisition is not always possible in the presence of multiple access interference, which occurs when more than one pair of transmitters and receivers is active at the same time. A long acquisition time is a major risk in the use of conventional UWB impulse radio communications. Therefore, a need exists for UWB communication systems without the synchronization difficulties associated with conventional approaches.

BRIEF SUMMARY OF THE INVENTION

The present invention consists of the combination of two chief features and innovations surrounding each of them. The first of these is known in the art as transmitted-reference (TR). The TR technique is defined as the transmission of two versions of a wideband carrier, one modulated by data and the other unmodulated. These two signals are recovered by the receiver and are correlated with one another to perform detection of the modulating data. The commonly used wideband carrier is a continuous, wideband pseudo-noise source, and the modulated and unmodulated versions are typically separated from one another in either time or frequency. In the present invention, the carriers used are continuous, wideband noise or continuous, wideband pseudo-noise. Thus, in the present invention, the term "transmitted-reference" refers to the transmission and reception of multiple instances of a noise or pseudo-noise waveform that are separated from each other by specific time intervals, known to the receiver. The noise waveform by itself is referred to as the carrier. Information is carried by such a signal by modulating the relative phase of the two transmitted noise waveforms. The receiver correlates the received signal with a delayed version of itself over a finite interval to demodulate the signal. In contrast to impulse radio methods, the use of the transmitted-reference technique makes synchronization with the individual pulses unnecessary. On the other hand, it also imposes a signal-to-noise ratio (SNR) penalty when compared with impulse radio techniques.

When two UWB TR signals are generated with different delays, it is possible, under certain conditions, to receive and demodulate both of them simultaneously, by applying two separate correlators to the same received signal. Thus, the use of different delays, each associated with a separate transmitter, imparts a certain amount of multiple access capacity to an UWB TR communications system. In one embodiment, "capacity" is defined as the supportable number of simultaneous users of the communications system.

The second feature of the present invention is a type of multiple access scheme called "delay hopping". In the context of UWB communications, delay-hopping refers to the method of varying the delay used in the TR UWB transmission in a fixed pattern known both to the transmitter and to the receiver. This pattern constitutes a code word, and multiple access capacity is obtained through the code-division multiple access (CDMA) technique.

CDMA is a multiple access method that allows users to access the channel in a random manner. Signal transmissions from different users can completely overlap in both time and frequency in a CDMA system. The demodulation of these signals makes use of the fact that each signal is associated with a code sequence known to the receiver, and this code is usually referred to as a spreading code. Spreading codes of different transmitters should be orthogonal (or nearly so) in the sense that multiple codes can be detected simultaneously with little interference to one another.

One representative embodiment of the present invention consists of combining the TR and DH techniques to create a UWB communications scheme for transmitting a continuous noise transmitted reference that is easy to synchronize and has a usable level of multiple access capacity.

DETAILED DESCRIPTION OF THE INVENTION

Figure 1:
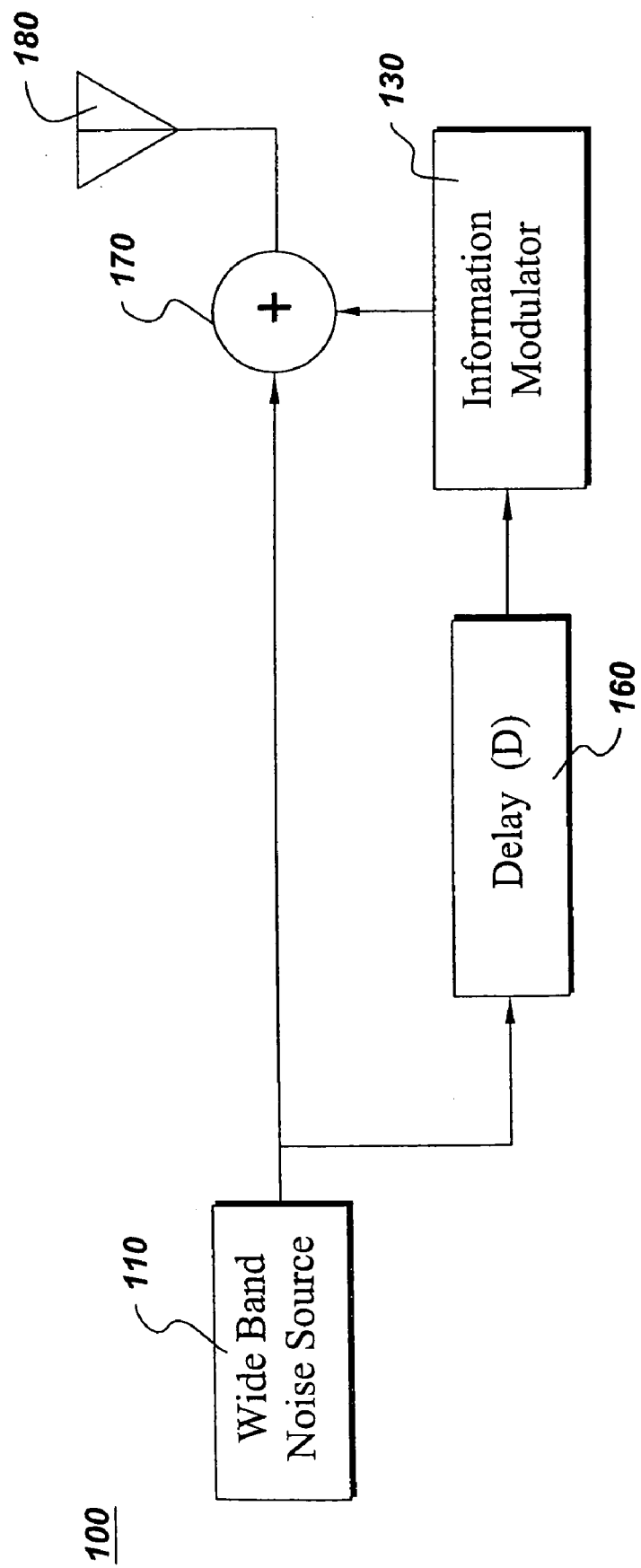
FIG. 1 is a block diagram of one representative embodiment of a transmitter for transmitting a continuous noise, delay hopped, transmitted reference.

In one embodiment, the specific transmitted-reference (TR) method described here requires the transmission of at least two continuous noise waveforms. The two continuous noise waveforms are separated by a time interval, D, known to both the receiver 300 (FIG. 3) and transmitter 100 (FIG. 1). The transmitted data is encoded by the relative amplitude polarity of the two continuous noise waveforms. One of the transmitted waveforms is always transmitted with the same polarity; this waveform is the reference signal and the other waveform, whose polarity is modulated, is the information-bearing signal. The name "transmitted-reference" comes from the fact that the reference signal is transmitted along with the information-bearing signal.

Figure 3:
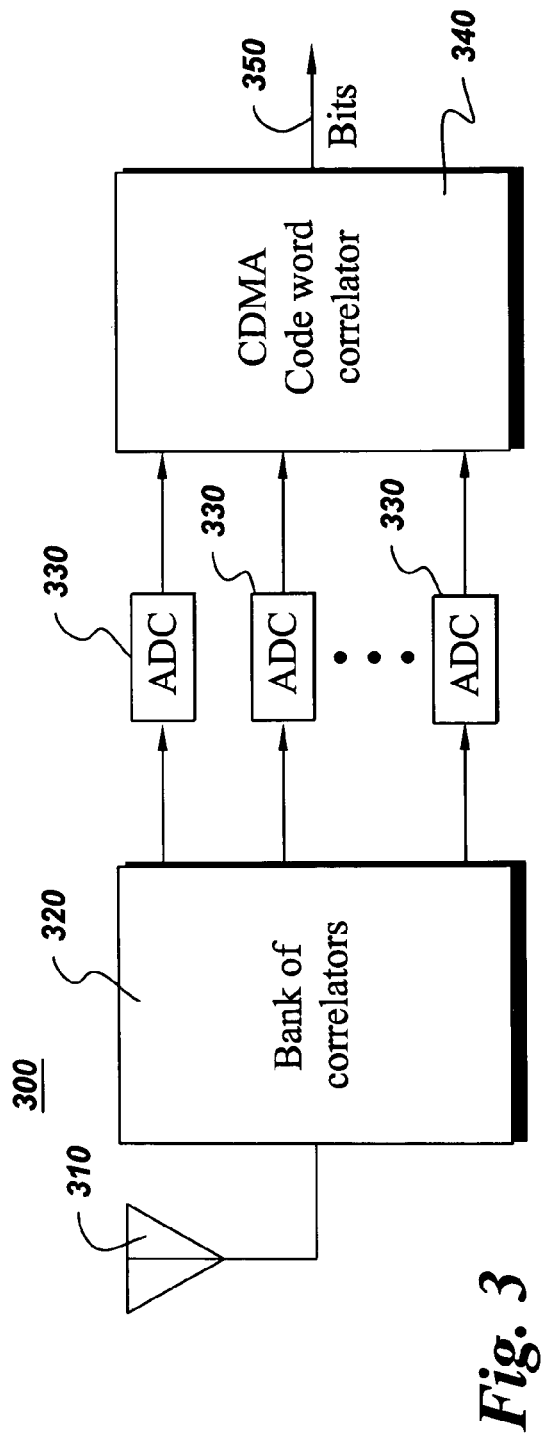
FIG. 3 is a block diagram of one representative embodiment of a receiver.

As shown in FIG. 1, one embodiment of a transmitter 100 used to transmit the continuous noise transmitted reference comprises a wideband noise source 110 connected to a delay 160 of delay time interval (D) and a summer 170. The output of the delay 160 is connected to information modulator 130 that is also connected to the summer 170. An antenna 180 is connected to the summer 170. In this embodiment, two instances of the continuous noise waveform are separated by delay time interval (D). The delay time interval (D) is known by the transmitter 100 and the receiver 300 (FIG. 3). The transmitted data is encoded by the relative amplitude polarity of the continuous noise waveforms.

Figure 2:
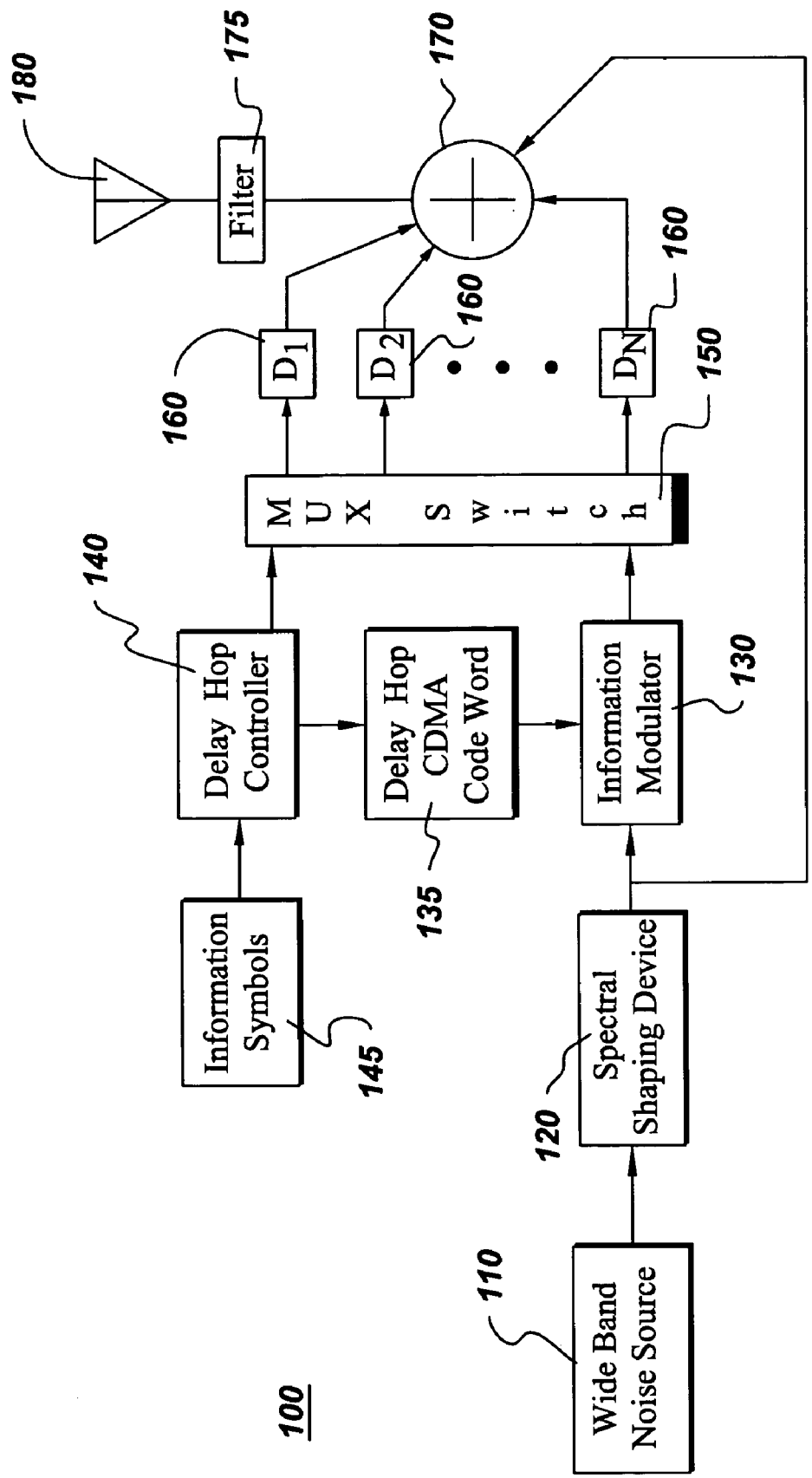
FIG. 2 is a block diagram of another representative embodiment of a transmitter for transmitting a continuous noise, delay hopped, transmitted reference.

In another embodiment of the transmitter 100, as shown in FIG. 2, a wideband noise source 110 is connected to a spectral shaping device 120 to produce a continuous noise carrier. The wideband noise source can comprise a back biased diode and passing the output of the diode through a capacitor to remove any DC bias. Also, the wideband noise source can comprise a high speed pseudo random noise generator. The spectral shaping device 120 filters the output of the wideband noise source 110. In one embodiment, the spectral shaping device 120 can comprise an analog filter. In another embodiment, the spectral shaping device 120 can comprise a digital filter. The spectral shaping device 120 removes energy from predetermined frequency bands to protect the integrity of the communication and/or to comply with federal government regulations. The spectrally shaped continuous noise transmitted reference is provided to the summer 170 and information modulator 130.

In one embodiment, the information modulator 130 impresses a delay hop code division multiple access (CDMA) code word on the continuous noise carrier from the spectral shaping device 120. A delay hop controller 140 also connected to the multiplexer and data polarity switch 150 derives delay hop CDMA code word 135. Information symbols 145 are provided to the delay hop controller 140 that uses the information symbols 145 to generate the delay hop CDMA code word 135. This code word consists of a sequence of delay values and an associated sequence of chip polarities of phases. The delay hop controller 140, in one embodiment, comprises a finite state sequential machine. In one embodiment, the code word comprises $N_C$ chips. Each of the $N_C$ chips comprises a pair of continuous noise waveforms separated by a fixed time interval or delay.

The multiplexer and data polarity switch 150 controls the application and routing of the wideband continuous noise waveforms to a band of fixed delays 160 and the application of the chip polarity values to the information-bearing waveform. In one embodiment, the delays 160 can comprise discrete delay analog components, such as, sections of coaxial transmission cable. In another embodiment, the delays 160 can comprise digital delay components. In another embodiment, where the noise source 110 comprises a pseudo random noise source, the delays 160 can be created by the pseudo random noise source when the noise is generated. The multiplexer switch 150 is controlled by the delay hop controller 140 by generating the delay hop CDMA code words 135 according to predetermined design criteria as imposed by bounds on the cross-correlations of the delay hop CDMA code words 135. The output of the spectral shaping device 120 and the outputs of the fixed delays 160 are combined by a summer 170 and summed to produce a continuous noise transmitted reference signal that comprises a sum of two instances of the continuous noise carrier generated by the wideband noise source 110 wherein a first instance comprises an undelayed continuous noise waveform and the second instance comprises the delayed instance of the at least one of the continuous noise waveforms impressed with the modulated delay hop CDMA code word 135. The continuous noise waveform is provided to filter 175 for further filtering and then is supplied to the antenna 180 and radiated.

Delay hopping is a code division multiple access (CDMA) scheme to be used with transmitted reference UWB. A limited amount of multiple access capacity is available in TR UWB by transmitting and receiving continuous noise transmitted reference signals with separate delays. A receiver 100 tuned to one delay will respond to received continuous noise transmitted reference signal at a separate delay at a far lower energy level than it would to continuous noise transmitted reference signals transmitted with its own delay value. However, when multiple transmissions with different delays are present at the receiver's antenna 310, spurious correlations between continuous noise transmitted reference signal originating from different transmitters can occur. By using CDMA code words whose chips represent a multiplicity of delays and a multiplicity of relative signal polarities between the reference and the information-bearing signal, delay hopping allows for a greater multiple access capacity than simply transmitting with different delays.

A transmitted reference/delay hopped (TR/DH) code word (also termed delay hop CDMA code word 135) consists of $N_C$ chips, transmitted sequentially. Each of the $N_C$ chips comprising a continuous noise transmitted reference separated by a fixed time interval. The continuous noise transmitted reference in different chip intervals are, in general, characterized by different delays. Note that the chip values are distinct both in associated delay value and in the polarity of the transmitted chip. When a code word of Nc chips is used to send one data bit, then if the data bit to be sent is a one, all information-bearing signals in each chip of the code word have the polarity of the code word polarity bit. If the data bit to be sent is zero, then all information-bearing signals in each chip of the code word are transmitted with the opposite polarity of the code word polarity bit.

Typical values of the parameters are as follows. The number of chips in a code word ($N_c$) will be in the range of 50 to 1000, and the duration of each chip will be in the range of 1 to 10 microseconds. The time delays separating the two continuous noise transmitted reference signals is drawn from a small set of possible time intervals. While there is no fundamental limitation on the duration of the intervals separating the continuous noise transmitted reference signals, shorter delays will be more accurately implementable in the transmitter 100 and the receiver 300.

The DH CDMA code words 135 are the most important part of the delay-hopped code division multiple access (CDMA) scheme. The DH CDMA code words 135 can easily be found using a computer search. For example, we have generated a set of 1000 of them, each composed of 200 chips, with delays drawn from a set of 16 possible delays. All of these DH CDMA code words 135 have autocorrelation side lobes that are less than 7% of the peak autocorrelation in absolute value. The maximum of the absolute value of the cross-correlation at any lag between any pair of these words is less than 10% of the peak autocorrelation. Longer codes, composed of more chips, will have even better correlation properties.

The top-level structure of the receiver 300 is depicted in FIG. 3. The receiver 300 for a transmitted reference/delay hopped (TR/DH) code word consists of a bank of correlators 320 connected to antenna 310. Each correlation in the bank of pulse-pair correlators 320 is tuned to a different delay. The bank of correlators 320 is connected to a CDMA code word correlator 350 having output 350. The CDMA code word correlator 340 is implemented, in one embodiment, as software running on a digital signal processor (DSP) 134. In another embodiment, the code word correlator 340 may be a programmable logic device (PLD) or application-specific integrated circuit (ASIC). The outputs of bank of correlators 300 are sampled by A/D converters 330 at a sample rate that is typically from 2 to 10 msps. This rate is determined by the chip time. In general, it is desirable to have two or more samples per chip.

Figure 4:
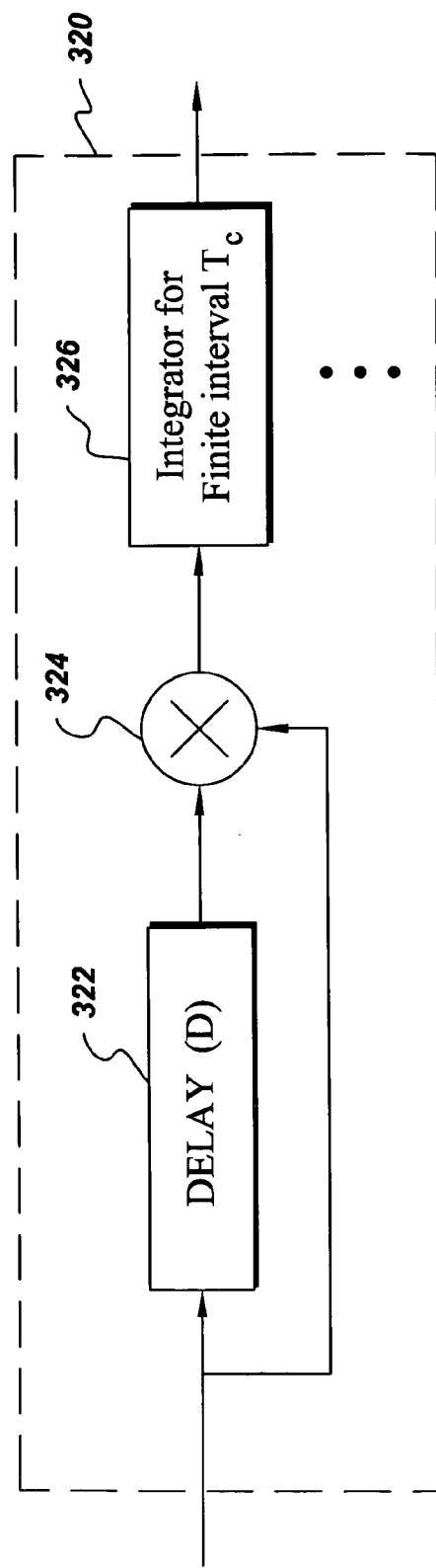
FIG. 4 is a block diagram of one representative embodiment of a bank of correlators.

Each correlator in the bank of correlators 320, as depicted in FIG. 4 is an analog circuit comprising a delay 322, a signal multiplier 324 (such as a four-quadrant Gilbert cell) and a finite-time integrator 326. The signal is split into two paths, of which one is delayed. The two versions of the received signal are multiplied, and the product is integrated over a chip time. The delay 322 is such that the leading pulse in the delayed circuit path is registered in time with the trailing pulse in the undelayed circuit path. This non-zero-mean product is integrated over a chip interval to produce a chip signal. Note that this circuit implements the mathematical operation of estimating the correlation of the received signal at a lag given by D.

The CDMA code correlator 340 will take samples of the multiple outputs of the bank of pulse pair correlators 320 and add them together in a manner dictated by the expected CDMA code word. The objective of this operation is to produce the registered sum of all the chip signals. When the expected code word matches the transmitted code word 135, this operation will have the effect of applying a gating waveform, matched to the entire delay hopped (DH) code word waveform, to the observed data at the output of the correlators 320. If the gating waveform matches the shape of the chip signal waveform, a matched filter is implemented; however, this requires knowledge of the relative timing of the sample clock and the transmitter chip clock. If the gating waveform applied to the individual chip is rectangular, with duration $2T_c$, then the effect of the CDMA code word correlator 340 is to add all of the individual chip waveforms in phase, producing an output which is a high-SNR version of the individual chip waveform.

Figure 5:
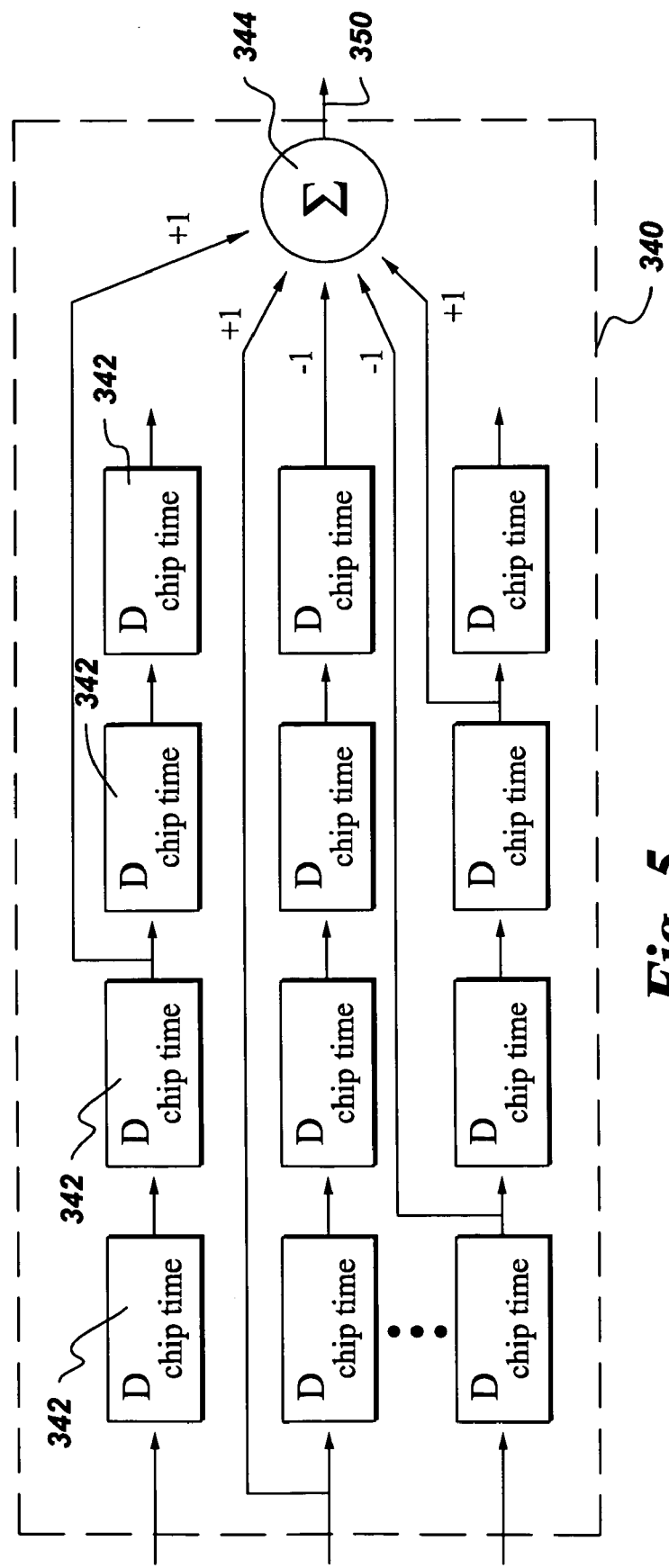
FIG. 5 is a block diagram of one representative embodiment of a CDMA code word correlator.

In one embodiment, the structure of the CDMA code correlator is depicted in FIG. 5. The specific code correlator 340 depicted uses a CDMA code word 135 that matches the correlator bank 320 output depicted in FIG. 4. Note that the chip time delays ($D_{chip\ time}$) 342 and signs (additions and subtractions) cause the elementary correlator peaks to be aligned in time with the same signs. The delayed outputs of the A/D converters from the CDMA code word correlator are summed by summer 344 and provided as output 350. Since the sample period of the A/D converters 330 has been specified to be a fraction of the chip period, the delays 342 in FIG. 5 may, in one embodiment, all be implemented as a number of digital storage devices, with provision for passing stored data from one to the next. Thus, in one embodiment, the CDMA code word correlator 340 of FIG. 5 depicts a synchronous digital circuit such as would be implemented in a programmable logic device (PLD) or ASIC.

Figure 6:
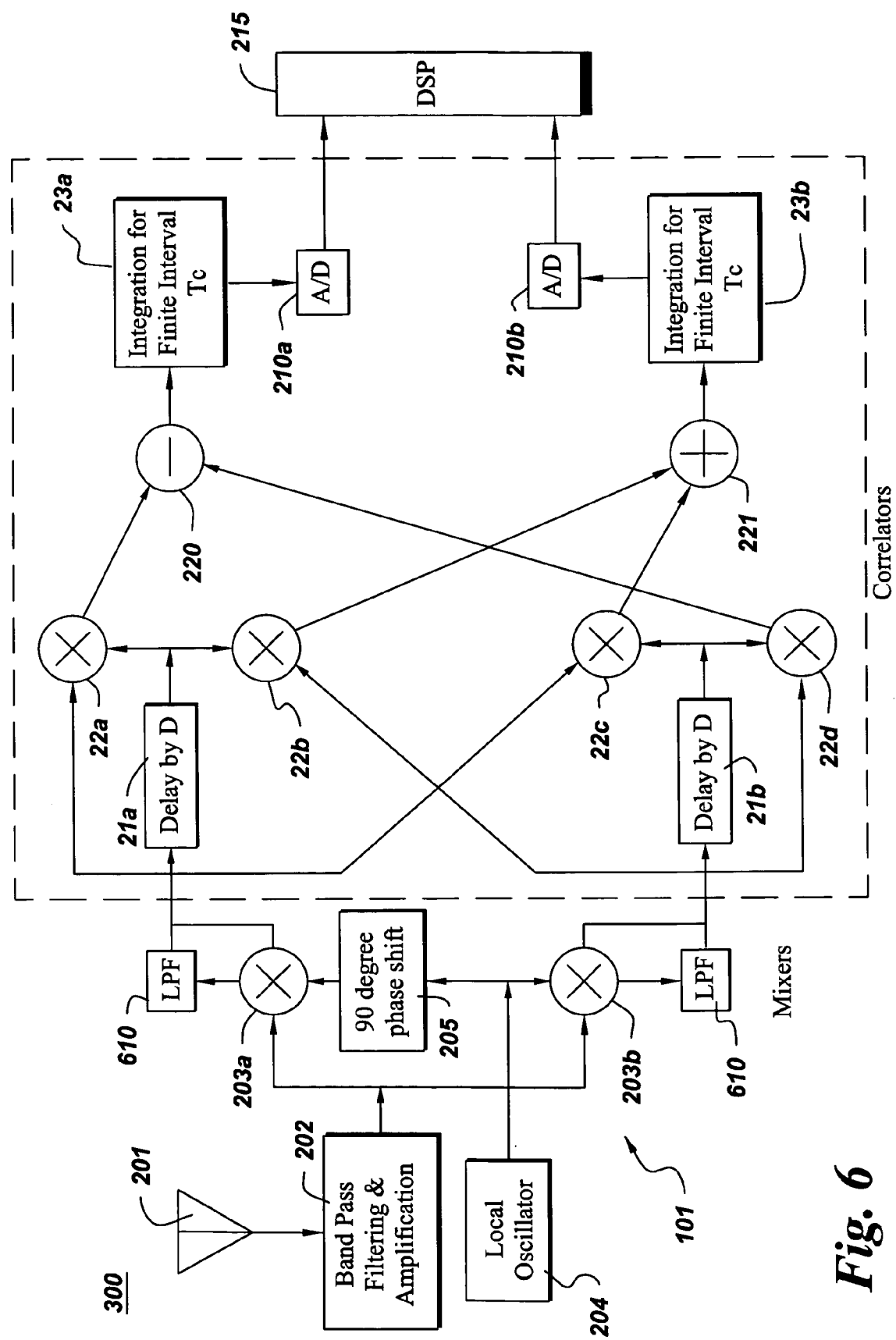
FIG. 6 is a block diagram of another representative embodiment of a receiver.

In FIG. 6, one embodiment of the transmitter 300 uses baseband demodulation to modify the shape of the correlation function of the received signal. Antenna 201 receives the ultra-wideband signal which is then bandpass filtered and amplified by amplifier 202. This signal is mixed in quadrature in mixers 203a and 203b resulting in real and imaginary parts of the complex incoming signal. The frequency of the local oscillator is chosen to approximate the frequency of the maximum spectral power density of the received signal from amplifier 202. The baseband signals from mixers 203a and 203b are filtered by low pass filters 610 and are delayed by time D in delays 21a and 21b, respectively. The outputs of delays 21a and 21b are then correlated with the undelayed signals from mixers 203a and 203b using analog multiplying correlators 22a, 22b, 22c, and 22d. The analog outputs from these correlators are subtracted and added in subtractor 220 and adder 221, respectively. The resulting analog signals from subtractor 220 and adder 221 can be seen to be an analog implementation of a complex correlation between the delayed and undelayed versions of the complex baseband signal from mixers 203a and 203b. The difference output of subtractor 220 is the real part, and the summed output of the adder 221 is the imaginary part of the complex correlated signal. Integrators 23a and 23b perform a complex integration which is digitized by ADCs 210a and 210b. The digitized results are sent to DSP 215. When implementing a receiver with multiple delay channels, then the items in the dotted line (21a–b, 22a–d, 23a–b, 210a–b, 220, 221) are repeated once for each different delay channel. Each receiver requires only one copy of antenna 201, amplifier 202, mixers 203a and 203b, local oscillator 204, phase shifter 205 and DSP 215.

The receiver 300 of FIG. 6 calculates the phase angle and amplitude of the complex value formed by the values from ADCs 210a and 210b. The operation of estimating the phase angle of a sequence of complex values modulated by an information sequence can be performed either through the use of local bit decisions or by squaring the input data. The correction of the phase allows the complex output of ADCs 210a and 210b to be converted to a real number the sign of which depends on the phase angle calculated from ADCs 210a and 210b. The real data so produced is either positive or negative, depending upon the relative phases of the pulses in the received pulse pairs, and so can be used in a manner which is completely analogous to the output of the receiver 100 depicted in FIG. 4. The absolute value of this data is determined by the modulus of the correlation function at this mismatched delay, and so it is relatively insensitive to delay mismatch.

Note that if multiple delay channels are required are required in the receiver of FIG. 6, the same I/Q converter can be shared by all the delay channels. Note also that if additional protection against delay variations is required, multiple delays per receiver channel can be implemented. For example, each delay channel could be replicated three times, once with the nominal delay, once with the nominal delay minus an offset and once with the nominal delay plus the same offset. For each transmitter being tracked, the best delays for each channel could be found by comparison of output energies.

Since the receiver 300 of FIG. 6 is operated by computing the autocorrelation of the input signal at a certain lag, the receiver 300 will also compute the autocorrelation at the same lag of any noise that is added to the signal. If the noise autocorrelation at that lag is non-zero, then it will produce an additive offset to the signal autocorrelation that will increase the bit error probability. This effect can be corrected in one of two ways, both of which require knowledge of the noise autocorrelation function. The first option is to specify the nominal delays at known zeros of the noise autocorrelation. The second is to subtract the known, non-zero noise correlation value from the output of the receiver prior to detection of bits. The noise autocorrelation function can be obtained from the frequency response functions of the front end filters that band limit the noise.

Figure 7:
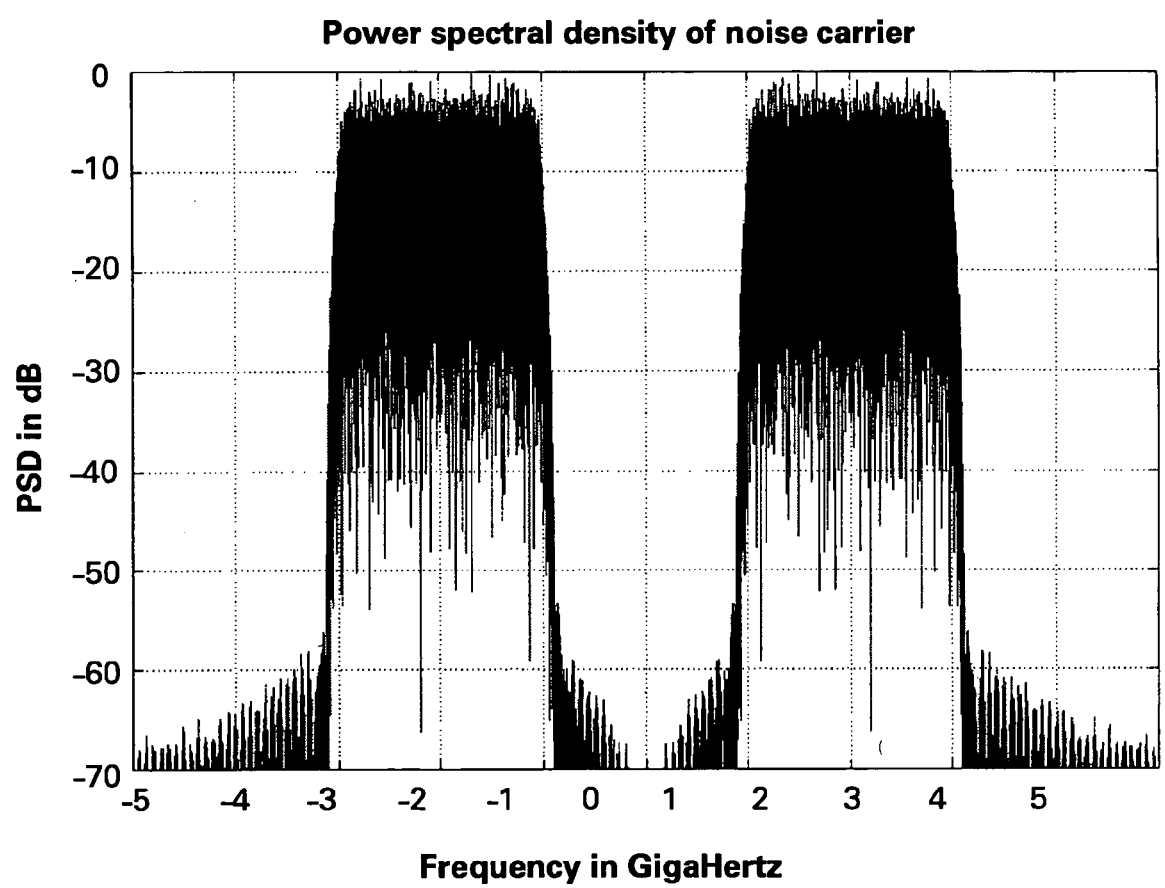
FIG. 7 is a diagram of the power spectral density of a noise carrier.
Figure 8:
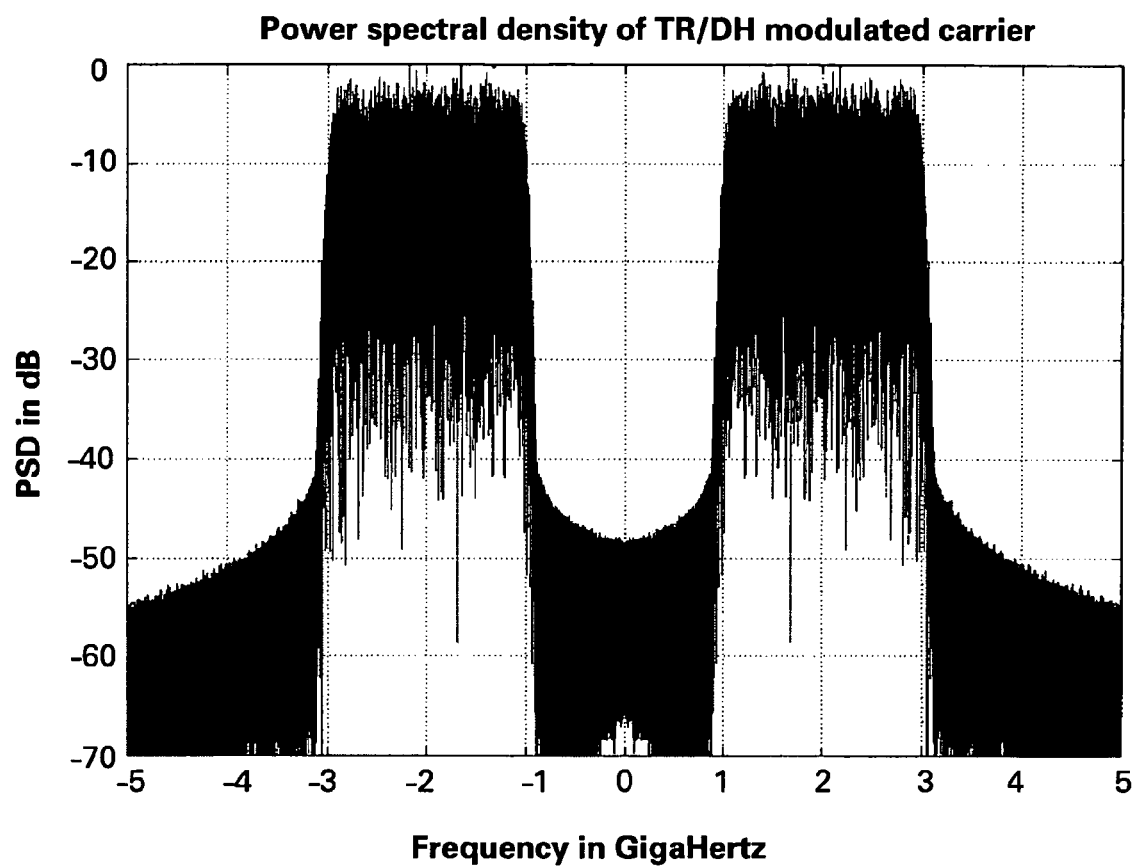
FIG. 8 is a diagram of the power spectral density of transmitted reference delay hopped modulated noise carrier.

As an example, consider the power spectral densities plotted in FIG. 7. This example will use a noise carrier. FIG. 7 shows the power spectral density (PSD) of a noise carrier with a 2 gigahertz bandwidth and a center frequency of 2 gigahertz. This is the sample spectrum of a simulated carrier, formed by filtering uncorrelated noise sampled at 40 gigahertz with a 551-tap FIR filter, with the desired bandpass response. FIG. 8 shows the same carrier modulated by a TR/DH CDMA code word 135. In one embodiment, the CDMA code word 135 is composed of sixteen 600-nanosecond chips, each imposing correlation on the noise carrier at one of four lags: 1.65 nanoseconds, 2.65 nanoseconds, 3.65 nanoseconds and 4.65 nanoseconds. As shown in FIG. 8, the most noticeable effect of the TR/DH modulation is to raise the overall sidelobe level. It should be appreciated that the raised overall sidelobe levels shown in FIG. 8 can be filtered out using filter 175 (FIG. 1).

Figure 9:
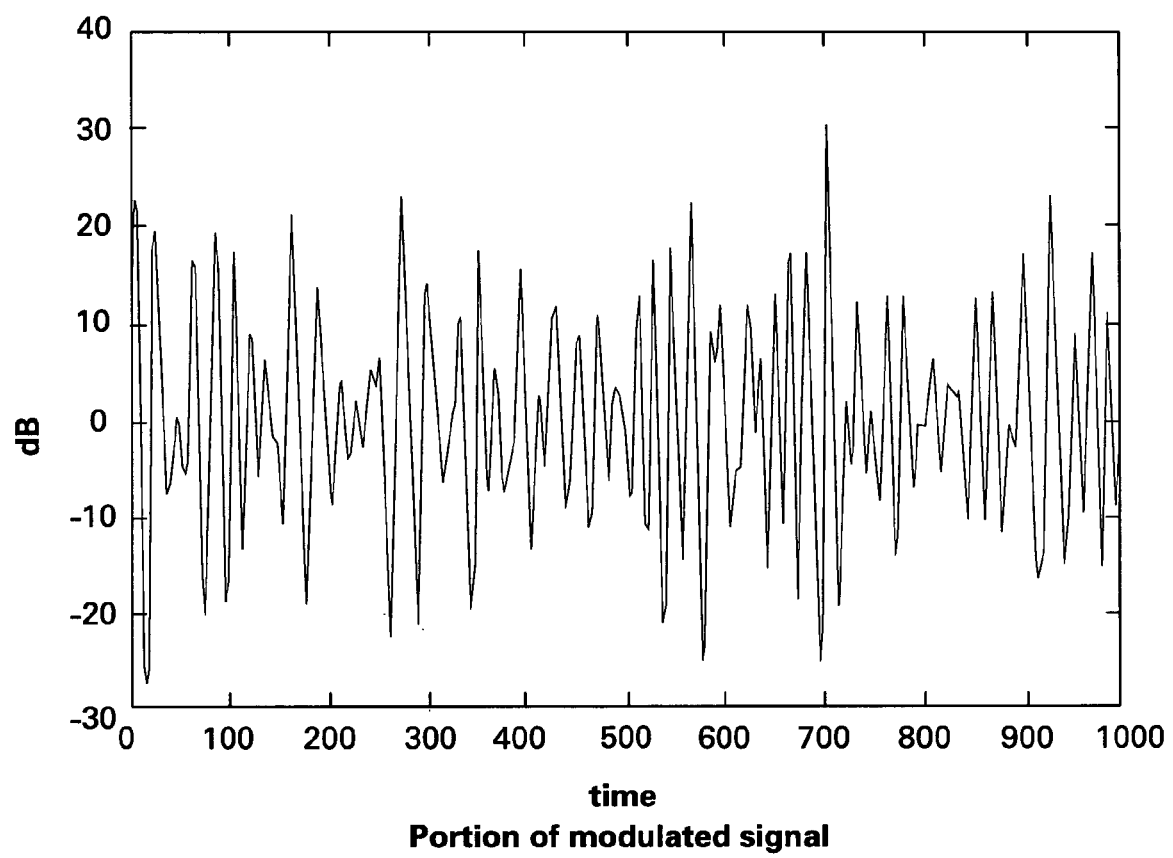
FIG. 9 is a diagram of a modulated signal.
Figure 10:
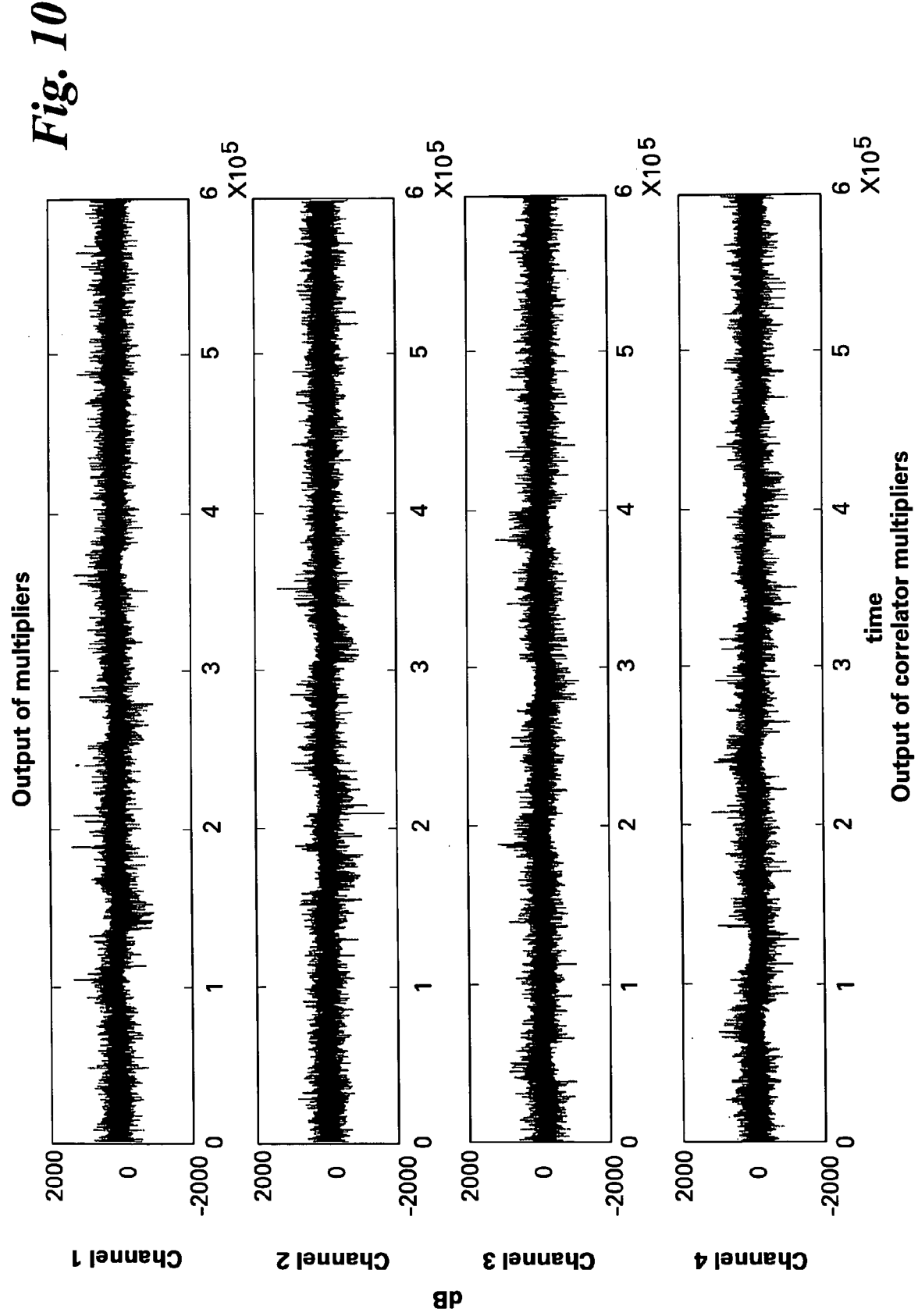
FIG. 10 is a diagram of the outputs of the correlator multipliers of one representative embodiment of the receiver.
Figure 11:
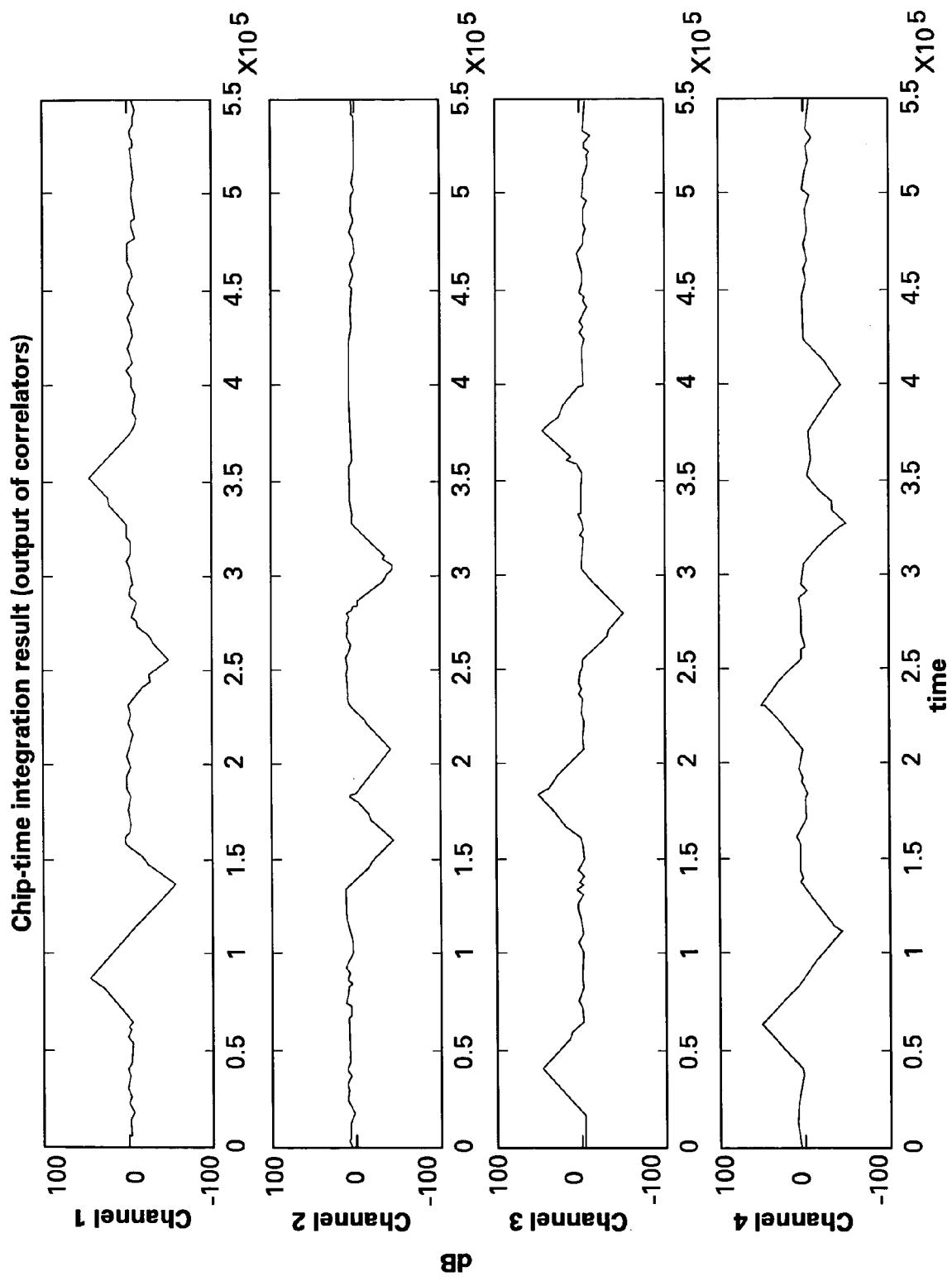
FIG. 11 is a diagram of the output of the integrator of one representative embodiment of the receiver.
Figure 12:
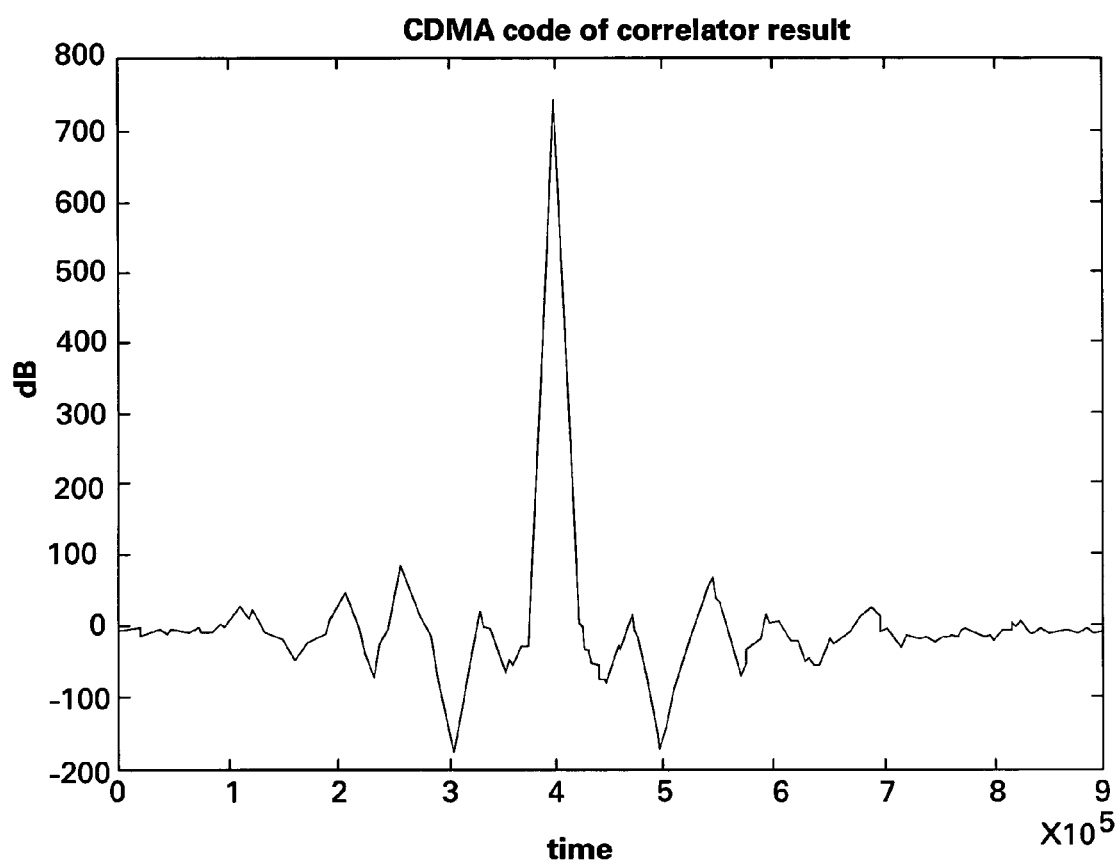
FIG. 12 is a diagram of an output of the CDMA code word correlator.

FIGS. 9–12 depict the various stages in the demodulation of the noise signal that has a spectrum depicted in FIG. 8. FIG. 9 is a portion of the noisy signaling waveform, and the segment depicted has a duration of 25 nanoseconds. FIG. 10 depicts the outputs of the four multipliers in the bank of correlators 320. Each correlator in the bank of correlators 320 has, for example, the structure depicted in FIG. 4. FIG. 10 depicts a time interval of 15 microseconds, during which the transmission of a single TR/DH code word of duration 9.6 microseconds takes place. The four pulse-pair correlators are tuned to the four delays used in the modulation: 1.65 nanoseconds, 2.65 nanoseconds, 3.65 nanoseconds and 4.65 nanoseconds. Note that the mean levels of the outputs of the multipliers shift away from zero at certain times; these times correspond to the times of the transmitted chips. FIG. 11 depicts the outputs of the four integrators of the pulse-pair correlators. The waveforms are the actual chip waveforms arising from the simulation. The DH CDMA code 135 transmitted in this example can be expressed as an ordered sequence of integers $\{3, 4, 1, -4, -1, -2, 3, -2, 4, -1, -3, -2, -4, 1, 3, -4\}$. This sequence of numbers represents the numbers of the transmitted delays, numbered from shortest to longest, and the signs of the numbers denote the polarity of the transmitted chip. The CDMA code word 135 can be "read off" the waveforms depicted in FIG. 11. For example, reading from left to right, the first channel to produce an output waveform is channel 3, and the polarity of that waveform is positive. FIG. 12 shows the output of a DH CDMA code correlator 340 of the type depicted in FIG. 3 when the input consists of the chip waveforms depicted in FIG. 11. For this relatively short code, the code correlator output has high sidelobes. Other DH CDMA codes will have upwards of a thousand chips, and a much lower ratio of peak absolute sidelobe level to peak mainlobe level in the output correlation.

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A radio communication system comprising:
   a transmitter for transmitting a plurality of continuous noise transmitted waveforms separated by a time interval D, wherein the transmitted waveforms are encoded by a relative polarity of two instances of the plurality of continuous noise transmitted data; and
   a receiver for receiving the plurality of continuous noise transmitted waveforms transmitted by the transmitter, the receiver comprising:
   a bank of correlators, each correlator in the bank of correlators being tuned to a different delay, each correlator of the bank of correlators comprising:
   a multiplier for multiplying delayed and undelayed versions of the received signal; and
   an integrator connected to the multiplier for integrating an signal output by the multiplier;
   a code word correlator connected to the integrator for correlating a code word corresponding to $N_C$ chips, each of the $N_C$ chips comprising a continuous noise transmitted waveform separated by a fixed time interval.

2. The radio communication system of claim 1, wherein the code word correlator comprises a digital signal processor (DSP) executing a code word correlator algorithm correlating the code word corresponding to the $N_C$ chips.

3. The radio communication system of claim 1, wherein the code word correlator 340 comprises a programmable logic device (PLD) executing a code word correlator algorithm correlating the code word corresponding to the $N_C$ chips.

4. The radio communication system of claim 1, wherein the code word correlator comprises an application specific integrated circuit (ASIC) executing a code word correlator algorithm correlating the code word corresponding to the $N_C$ chips.

5. The radio communication system of claim 1 wherein the receiver comprises:
 an antenna for receiving a received signal comprising the plurality of continuous noise transmitted waveforms transmitted by the transmitter;
 a baseband demodulator connected to the antenna for converting the received signal into real and imaginary parts of a complex output, the baseband demodulator comprising:
 a delay adapted to delay both the real and imaginary parts of the complex output;
 a signal multiplier connected to the delay, the signal multiplier being adapted to perform a complex multiplication of a direct path of the received signal by a complex conjugate of a delayed path of the received signal, and wherein the integrator comprising two integrators, one for the real part and another for the imaginary part of the product signal output by the signal multiplier.

6. The radio communication system of claim 1 wherein the plurality of continuous noise transmitted waveforms being transmitted sequentially with a plurality of code words.

7. The radio communication system of claim 1 wherein the transmitter comprises:
 a noise source for generating the plurality of continuous noise transmitted waveforms;
 a delay connected to the noise source for delaying at least one of the plurality of continuous noise carriers by the time interval D;
 an information modulator connected to the delay for modulating the code word into at least one of the plurality of continuous noise transmitted waveforms; and
 a summer connected to the information modulator and the noise source for combining the two instances of the plurality of continuous noise transmitted waveforms wherein a first instance comprises an undelayed continuous noise transmitted waveform and the second instance comprises a delayed continuous noise transmitted waveform comprising the modulated code word.

8. The radio communication system of claim 7 wherein the transmitter comprises a filter connected to the noise source for spectrally shaping the continuous noise transmitted waveform.

9. The radio communication system of claim 7 wherein the noise source comprises a wideband noise source.

10. The radio communication system of claim 7 wherein the noise source comprises a pseudo random noise source.

11. The radio communication system of claim 10 wherein the delay is comprised in the pseudo random noise source and the continuous noise transmitted waveforms being delayed during generation by the pseudo random noise source.

12. The radio communication system of claim 1 wherein the delay time interval D can comprise more than a single delay, where multiple delays have nominal values spread around a nominal value of the transmitter's delay, a delay actually used for demodulation being selected from among existing delays as that one whose output has the highest energy in response to a transmission at the nominal delay.

13. An ultra wideband communication system comprising:
 a transmitter 100 for generating a plurality of continuous noise transmitted waveforms separated by a time interval, D, transmitted waveforms being encoded by a relative polarity of two instances of the plurality of continuous noise, the transmitter comprising;
 a wideband noise source for generating the plurality of continuous noise transmitted waveforms;
 a delay 160 connected to the noise source for delaying at least one of the plurality of continuous noise carriers by the time interval D;
 an information modulator connected to the delay for modulating the code word into at least one of the plurality of continuous noise transmitted waveforms; and
 a summer connected to the information modulator and the noise source for combining the two instances of the plurality of continuous noise transmitted waveforms wherein a first instance comprises an undelayed continuous noise transmitted waveform and the second instance comprises a delayed continuous noise transmitted waveform comprising the modulated code word;
 a receiver for receiving the plurality of continuous noise transmitted waveforms transmitted by the transmitter, the receiver comprising:
 a bank of correlators, each correlator in the bank of correlators being tuned to a different delay, each correlator of the bank of correlators comprising;
 a multiplier for multiplying delayed and undelayed versions of the received signal; and
 an integrator connected to the multiplier for integrating an signal output by the multiplier;
 a code word correlator connected to the integrator for correlating a code word corresponding to $N_C$ chips, each of the $N_C$ chips comprising a continuous noise transmitted waveform separated by a fixed time interval.

14. The ultra wideband communication system of claim 13 wherein the noise source comprises a wideband noise source.

15. The ultra wideband communication system of claim 13 wherein the noise source comprises a pseudo random noise source.

16. The ultra wideband communication system of claim 15 wherein the delay is comprised in the pseudo random noise source and the continuous noise transmitted waveforms being delayed during generation by the pseudo random noise source.

17. A method of communicating a continuous noise transmitted waveform, the method comprising the steps of:
 generating a plurality of continuous noise transmitted waveforms;
 delaying at least one of the continuous noise transmitted waveforms by a time interval, D;
 modulating a code word into a delayed instance of at least one of the continuous noise transmitted waveforms wherein the code word comprises $N_C$ chips, each of the $N_C$ chips comprising a continuous noise transmitted waveform separated by a fixed time interval;
 transmitting a sum of two instances of the plurality of continuous noise transmitted waveforms wherein a first instance comprises an undelayed continuous noise transmitted waveform and the second instance comprises the delayed instance of the at least one of the continuous noise transmitted waveforms including the modulated code word;
 receiving the sum of two instances of the plurality of continuous noise transmitted waveforms; and
 correlating the code word corresponding to the $N_C$ chips from the received sum of two instances of the plurality of continuous noise transmitted waveforms.

18. The method of claim 17 further comprising the steps of:
- correlating the received sum of two instances of the plurality of continuous noise transmitted waveforms to a delay having time interval, D;
- multiplying delayed and undelayed versions of the received sum of two instances of the plurality of continuous noise transmitted waveforms; and
- integrating the multiplied delayed and undelayed versions of the received sum of two instances of the plurality of continuous noise transmitted waveforms.

19. The method of claim 17 further comprising the step of selecting the time interval D to correspond to a predetermined value.

20. The method of claim 17 further comprising the step of spectrally shaping the generated plurality of continuous noise transmitted waveforms.

21. The method of claim 17 wherein the generated plurality of continuous noise transmitted waveforms comprises wideband pseudo noise.

22. The method of claim 17 wherein the generated plurality of continuous noise transmitted waveforms comprises wideband noise.

23. The method of claim 17 wherein the step of correlating the code word is performed on a digital signal processor (DSP) executing a code word correlator algorithm, further comprising the step of performing analog-to-digital conversions of the received sum of two instances of the plurality of continuous noise transmitted waveforms and providing digital inputs to the digital signal processor.

24. The method of claim 17 wherein the step of correlating the code word is performed on a programmable logic device executing a code word correlator algorithm.

25. The method of claim 17 wherein the step of correlating the code word is performed on a application specific integrated circuit (ASIC) executing a code word correlator algorithm.

26. The method of claim 17 wherein the step of receiving further comprises the steps of:
- baseband demodulating a received signal to convert the received sum of two instances of the plurality of continuous noise transmitted waveforms to real and imaginary parts of a complex output;
- delaying both the real and imaginary parts of the complex output;
- performing a complex multiplication of a direct path by a complex conjugate of a delayed path; and
- integrating the real part and the imaginary part of the product signal output produced by the step of performing the complex multiplication.

27. The method of claim 17 wherein the time interval D can be more than a single delay, where multiple delays have nominal values spread around a nominal value of the transmitter's delay, a delay actually used for demodulation being selected from among existing delays as that one whose output has the highest energy in response to a transmission at the nominal delay.

28. A method of communicating a continuous noise transmitted waveform, the method comprising the steps of:
- generating a plurality of continuous noise transmitted waveform using a wideband noise source;
- delaying at least one of the continuous noise transmitted waveform by a time interval, D;
- modulating a code word into a delayed instance of at least one of the continuous noise transmitted waveform wherein the code word comprises $N_C$ chips, each of the $N_C$ chips comprising a continuous noise transmitted waveform separated by a fixed time interval;
- transmitting a sum of two instances of the plurality of continuous noise transmitted waveforms wherein a first instance comprises an undelayed continuous noise transmitted waveform and the second instance comprises the delayed instance of the at least one of the continuous noise transmitted waveforms including the modulated code word;
- receiving the sum of two instances of the plurality of continuous noise transmitted waveforms;
- correlating the received sum of two instances of the plurality of continuous noise transmitted waveforms to a delay having time interval, D;
- multiplying delayed and undelayed versions of the received sum of two instances of the plurality of continuous noise transmitted waveforms;
- wherein the correlating step comprises:
- integrating the multiplied delayed and undelayed versions of the received sum of two instances of the plurality of continuous noise transmitted waveforms; and
- correlating the code word corresponding to the $N_C$ chips from the received sum of two instances of the plurality of continuous noise transmitted waveforms.

* * * * *

UNITED STATES PATENT AND TRADEMARK OFFICE
CERTIFICATE OF CORRECTION

PATENT NO. : 7,068,715 B2  Page 1 of 1
APPLICATION NO. : 09/974032
DATED : May 04, 2006
INVENTOR(S) : Ralph Thomas Hoctor et al.

It is certified that error appears in the above-identified patent and that said Letters Patent is hereby corrected as shown below:

On The Title Page Item (73) Assignee should read

--Assignee: General Electric Company --.

Item (75) should read 4th Inventor: --Nick Andrew Van Stralen--

Col. 1, Line 11

Correct Government Contract number is: --70NANBOH3035--

Signed and Sealed this

Twenty-fourth Day of April, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,068,715 B2 | Page 1 of 1 |
| APPLICATION NO. | : 09/974032 | |
| DATED | : June 27, 2006 | |
| INVENTOR(S) | : Ralph Thomas Hoctor et al. | |

It is certified that error appears in the above-identified patent and that said Letters Patent is hereby corrected as shown below:

On The Title Page Item (73) Assignee should read

--Assignee: General Electric Company --.

Item (75) should read 4th Inventor: --Nick Andrew Van Stralen--

Col. 1, Line 11

Correct Government Contract number is: --70NANBOH3035--

This certificate supersedes Certificate of Correction issued April 24, 2007.

Signed and Sealed this

Twenty-second Day of May, 2007

JON W. DUDAS
*Director of the United States Patent and Trademark Office*